NONDESTRUCTIVE READ TRANSISTOR MEMORY CELL

Filed June 21, 1965

INVENTOR.
LEONARD ROY HARPER
BY Otto Schmid, Jr.
ATTORNEY

Jan. 21, 1969 L. R. HARPER 3,423,737

NONDESTRUCTIVE READ TRANSISTOR MEMORY CELL

Filed June 21, 1965 Sheet 2 of 2

United States Patent Office 3,423,737

Patented Jan. 21, 1969

3,423,737

NONDESTRUCTIVE READ TRANSISTOR MEMORY CELL

Leonard Roy Harper, San Jose, Calif., assignor to International Business Machines Corporation, Armonk, N.Y., a corporation of New York Filed June 21, 1965, Ser. No. 465,593
U.S. Cl. 340—173 10 Claims
Int. Cl. G11b 9/00; G06f 15/00

This invention relates to memory circuits and more particularly to memory circuits which employ transistors in the basic memory cell.

A need has arisen in recent computer systems for an inexpensive, fast device for local storage where fast access to relatively small amounts of information is imperative. For compatibility with other circuits it is desirable for the local memory to be produced in monolithic integrated circuits. However, prior art memory cells are generally characterized by circuits which are relatively complicated in design including two active circuit elements, two or more capacitive or inductive elements, a number of resistive components and one or more sources of potential. In the present state of the monolithic integrated circuit art, inductors, large value capacitors and large value resistors are difficult to obtain and therefore circuits must be designed which do not require these components. Monolithic integrated circuits with the least number of components have a higher yield and also require a minimum area of the monolithic chip for the circuit. It is therefore the primary object of this invention to provide an improved memory cell utilizing a minimum number of components in a simplified circuit arrangement.

It is another object of this invention to provide a memory cell suitable for manufacture using monolithic integrated circuit techniques.

It is an additional object of this invention to provide a memory cell suitable for selective operation in a memory matrix.

It is a further object of this invention to provide a memory cell having a very fast access time.

According to the invention there is provided a memory cell having a very fast access time comprising two transistors, each having collector and base directly cross-coupled and having first and second diode means connected to the emitter of each transistor so that non-destructive readout of the state of the cell can be obtained selectively through one of the first diode means when a readout pulse is simultaneously applied to both second diode means and so that data can be set in the cell by simultaneously applying a signal through one of the first diode means and through both second diode means to change the state of the memory cell.

The foregoing and other objects, features and advantages of the invention will be apparent from the following more particular description of preferred embodiments of the invention, as illustrated in the accompanying drawings.

Figures 1, 2:
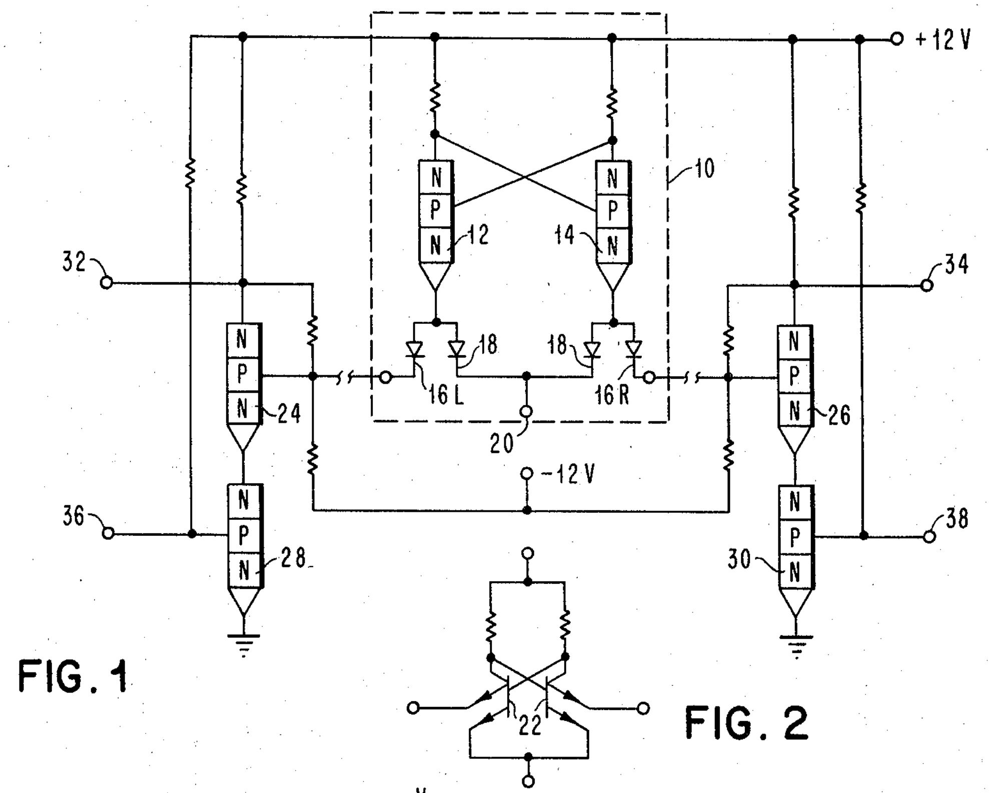
FIGURE 1 is a schematic diagram of the memory cell embodying the invention.
FIGURE 2 is a schematic diagram of the memory cell in integrated form.

The memory cell 10 is shown in dotted lines in FIGURE 1. The memory cell comprises two transistors 12, 14 each having direct cross-connection between collector and base. A first diode means 16 and a second diode means 18 is connected to the emitter of each transistor.

Second diode means 18 are connected together and terminal 20 is provided for addressing the memory cell in the word sense when the memory cell is one of a matrix of memory cells. Read controls means comprising transistors 24, 26, 28, 30 is provided to control readin and readout of the memory cell. Readout is accomplished by raising the potential at terminal 20 to a voltage above the bases of transistors 12, 14. The state of the trigger is then indicated by a signal through diode means 16 corresponding to the conducting transistor 12 or 14. To change the state of the memory cell the potential is again raised at terminal 20 and a set input pulse is coupled through one of the diodes 16 to raise the emitter of the conducting transistor thereby causing the other transistor in the memory cell to start conducting which then cuts off the originally conducting transistor. This operation is described in detail below.

The action of the diodes means connected to the emitter of each of the cross-coupled transistors in the embodiment shown in FIGURE 1 can be duplicated by auxiliary emitters on the transistors. The embodiment of the invention shown in FIGURE 2 incorporates this change so that double emitter transistors 22 can be coupled as shown to provide the same function as the cell 10 shown in dotted lines in FIGURE 1. This embodiment requires a minimum number of isolation regions when produced in monolithic integrated circuit form. This is important since the result is a simplification and a cost reduction as well as the ability to produce more memory cells on the same size monolithic chip.

The embodiment of the memory cell shown in FIGURE 1 comprises a cross-coupled pair of transistors 12, 14 operated in an emitter follower configuration. The cell is normally held in one of its bistable states by the diodes 18 connected to terminal 20. In normal operation the cell is one of a matrix of memory cells and is normally addressed by line W in the word sense which connects all of terminals 20 and when so addressed presents the information in each of the bits on this coordinate at the outputs to readout means comprising transistors 24 and 26. This addressing is accomplished by raising line W to a voltage higher than the bases of transistors 24, 26. If the trigger pair of transistors 12, 14 are in a state in which transistor 12 is conducting, the voltages are as follows: line W is at ground potential; the emitter of transistor 12 is at .7 volt (before drop of the diode connecting it to the word line W); the base of transistor 12 is at approximately 1.4 volts; and the collector of transistor 12 is at .8 volt. The collector voltage holds transistor 14 off since its base voltage cannot rise above .8 volt and its emitter would have to fall to .2 volt to draw current at which time the diode 18 connecting it to line W would be cut off. As the voltage on line W is raised, all transistor voltages similarly rise and the emitter of transistor 12 transfers its current from the diode 18 to line W to the diode 16L and thence to the base of transistor 24. The base of transistor 24 is then clamped at $V_{ce}$ of transistor 28 plus $V_{bc}$ of transistor 24 or .15+.7=.85 v. The emitter of transistor 12 is now at .85+.7=1.55 v. The emitter of transistor 14 does not conduct since the base of transistor 26 is also at .85 v. since this transistor conducts enough to hold the collector of transistor 26 at about 3 v. Since the $V_{bc}$ of transistor 14 is less than the threshold no current flows. Since the base of transistor 24 is at approximately the same voltage as the base of transistor 26, the other diode 16R to transistor 14 does not conduct and only transistor 24 responds. It can be seen that the status of the memory cell is read out in the collectors of transistors 24 and 26 at terminals 32, 34 unchanged, as current continues to flow through transistor 12.

This is a non-destructive form of read-out, but the state of the memory cell can be changed by setting means comprising transistors 28 and 30. The state of the cell is changed by cutting off one of transistors 28 or 30 by an appropriate input to terminals 36 or 38. In the example discussed above, transistor 28 is cut off to change the state of the cell. This causes the voltage at the base of transistor 24 to rise so that diode 16L no longer conducts current and the emitter of transistor 12, and therefore the collector, rises until the base of transistor 14 starts drawing current. When transistor 14 is conducting enough the collector of this transistor is pulled down thereby cutting off and holding off transistor 12. When the word selection line is dropped to ground again, the state remains in this altered condition. Thus the current originally flowing in transistor 12 is transferred completely to transistor 14 and the state of the cell is reversed. The state of the memory cell may also be changed by applying a negative voltage to the base of transistor 26, but this manner of operation is not so reliable since only a fraction of a volt exists between the selected memory cell emitters and their counterparts on other word lines.

Figure 3:
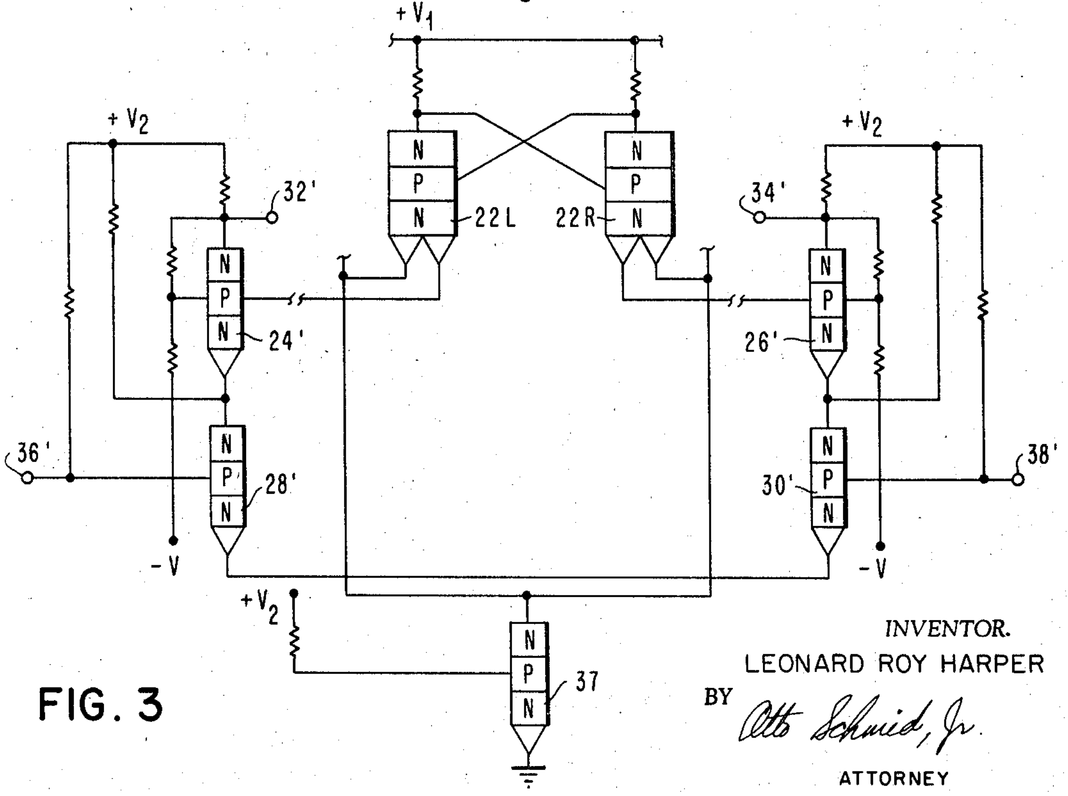
FIGURE 3 is a schematic diagram of the memory cell using double emitter transistors.
Figure 4:
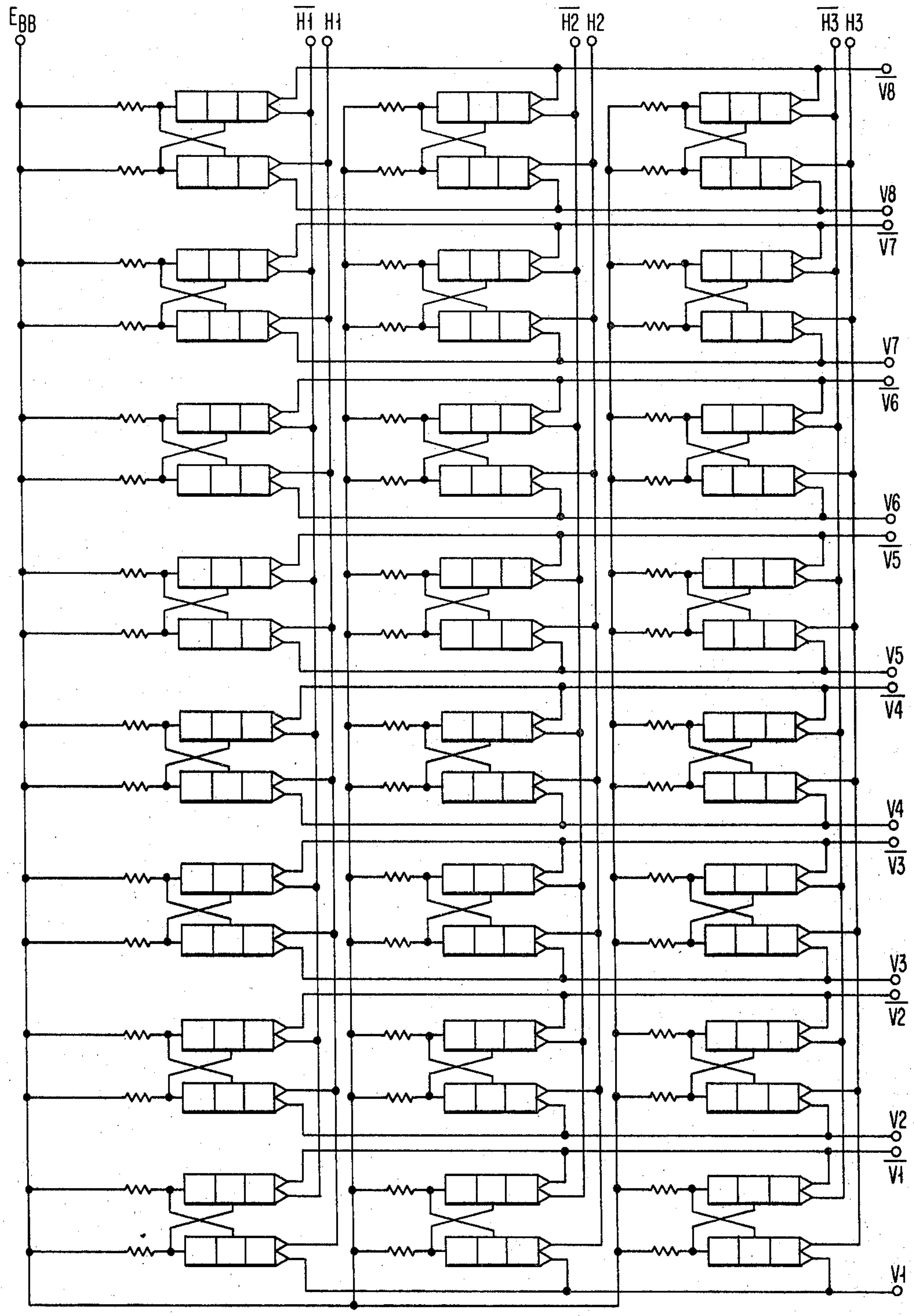
FIGURE 4 is a schematic diagram of a storage matrix utilizing the embodiment of the memory cell shown in FIGURE 3.

Since the action of the pair of diodes connected to the emitters of each of the cross-coupled transistor pair can be duplicated by auxiliary emitters on the transistors, the embodiment shown in FIGURE 3 replaces these diodes with a second emitter stripe on each of these transistors as shown in FIGURE 2. The operation of this circuit is similar to the operation described above in connection with the embodiment shown in FIGURE 1. Double emitter transistors 22L and 22R function to replace transistors 12 and 14 and diodes 16, 18. The reference characters of the elements having the same function as described above are shown with a prime (′) in FIGURE 3. Transistor 37 functions as a column select control.

An embodiment showing this cell in a multiple array is shown in FIGURE 3 in which eight cells are arranged in one coordinate and three cells in the other direction for a total of 24 cells. These cells can be addressed in either of two ways, in that the horizontal lines $H_1$–$H_3$ can be used for word addresses which produces eight bits at a time, or the vertical lines $V_1$–$V_8$ can be used for addressing which provides three bits out. In actual operation this array functions as an eight-bit serial word addressed array. Each of the three eight-bit words are accessed serially so that serial arithmetic operations can be performed by summing two bits and storing the results in the third position. If desired, an eight-bit word can be read out in parallel.

In a monolithic configuration the transistors are deposited in multidiffusion on a substrate and are normally shorted to that substrate except for the use of an isolation region around each separate transistor or transistors with common collector. Normally a transistor is diffused onto a substrate with a collector forming an N type region on a P substrate, the P type base diffused next within the collector and the N type emitter diffused within the P type base. Surrounding this transistor must be a P diffusion penetrating below the collector into the P type substrate to permit electrical isolation. Since the depth of this diffusion makes close definition of the width difficult, it can occupy a considerable area of the chip and for this reason the circuit is advantageous since only two isolation regions are required per memory cell.

While the invention has been particularly shown and described with reference to preferred embodiments thereof, it will be undertsood by those skilled in the art that various changes in form and details may be made therein without departing from the spirit and scope of the invention.

What is claimed is:

1. A memory cell comprising a pair of transistors each having an emitter, base and collector;

means for directly cross-coupling the collectors and the bases of said transistors;

a first and a second diode means;

means for coupling said first and said second diode means to the emitter of each of said transistors;

means for applying a first signal simultaneously to said second diode means; and means for applying a second signal selectively through one of said first diode means during the time said first signal is present to place the corresponding transistor in a conducting state whereby data is stored in said cell corresponding to the actuated first diode means.

2. The combination according to claim 1 wherein said pair of transistors and said diode means comprises a pair of double-emitter transistors.

3. A memory cell comprising a pair of transistors each having an emitter, base and collector;

means for directly cross-coupling the collectors and the bases of said transistors;

a first and a second diode means;

means for coupling said first and said second diode means to the emitter of each of said transistors;

means for setting the memory cell to one stable state;

readout means for indicating the state of said memory cell, and means for applying a readout signal simultaneously to said second diode means so that the state of said memory cell is indicated selectively through one of said first diode means to said readout means.

4. The combination according to claim 3 wherein said pair of transistors and said diode means comprises a pair of double-emitter transistors.

5. A memory cell comprising a pair of transistors each having a first and a second emitter, a base and a collector;

means for directly cross-coupling the collectors and the bases of said transistors;

means for applying a first signal simultaneously to said first emitters of each of said transistors; and means for applying a second signal selectively through the second emitter of one of said transistors during the time said first signal is present to place the corresponding transistor in a conducting state whereby data is stored in said cell corresponding to the actuated second emitter.

6. A memory cell comprising a pair of transistors each having a first and a second emitter, a base and a collector;

means for directly cross-coupling the collectors and the bases of said transistors;

means for setting the memory cell to one stable state;

readout means for indicating the state of said memory cell, and means for applying a readout signal simultaneously to said second emitter of each transistor so that the state of said memory cell is indicated selectively through one of said first emitters corresponding to the state of said cell to said readout means.

7. A memory cell capable of operating in a first and a second bistable state, comprising a pair of transistors each having an emitter, base and collector;

means for directly cross-coupling the collectors and the bases of said transistors;

a first and a second diode coupled to the emitter of each of said transistors;

means for applying a first signal simultaneously to one of said diodes coupled to each emitter; and means for applying a second signal selectively through the second of said diodes during the time said first signal is present to place the corresponding transistor in a conducting state whereby data is stored in said cell corresponding to the diode actuated by said second signal.

8. A memory cell comprising
a pair of transistors each having an emitter, base and collector;
means for directly cross-coupling the collectors and the bases of said transistors;
a first and a second diode coupled to the emitter of each of said transistors;
means for setting the memory cell to one stable state;
readout means for indicating the state of said memory cell, and
means for applying a readout signal simultaneously to said second diode coupled to said emitters so that the state of said memory cell is indicated selectively through the one of said first diodes corresponding to said storage state to said readout means.

9. A memory cell having two stable states represented by selective conduction of a trigger pair of transistors comprising
a first and a second trigger transistor each having an emitter, base and collector;
means for directly cross-coupling the collectors and the bases of said transistors;
a first and a second diode coupled to the emitter of each of said transistors;
a control terminal means for coupling said second diodes to said control terminal;
read control means comprising a first and a second transistor coupled to each of said first diodes;
means for applying a control pulse to said control terminal; and
means for applying a read-in signal to one of said first read control transistors coincident with the presence of said control signal whereby the corresponding trigger transistor is actuated to a conducting state through the corresponding first diode to set the memory cell to the corresponding state.

10. A memory cell having two stable states represented by selective conduction of a trigger pair of transistors comprising a first and a second trigger transistor each having an emitter, base and collector;
means for directly cross-coupling the collectors and the bases of said transistors;
a first and a second diode coupled to the emitter of each of said transistors;
a control terminal means for coupling said second diodes to said control terminal;
read control means comprising a first and a second transistor coupled to each of said first diodes;
means for applying a control pulse to said control terminal;
means for applying a read-in signal to one of said first read control transistors coincident with the presence of said control signal whereby the corresponding trigger transistor is actuated to a conducting state through the corresponding first diode to set the memory cell to the corresponding state; and
means for then applying a control pulse to said control terminal whereby the state of the memory cell is nondestructively read out to the corresponding second read control transistor.

References Cited

UNITED STATES PATENTS

| | | | |
|---|---|---|---|
| 3,178,592 | 4/1965 | Fischer et al. -------- | 307—238 |
| 3,218,613 | 1/1965 | Gribble et al. ------- | 340—173 |
| 3,345,518 | 10/1967 | Thompson ---------- | 307—299 |

STANLEY M. URYNOWICZ, Jr., *Primary Examiner.*

J. F. BREIMAYER, *Assistant Examiner.*

U.S. Cl. X.R.

307—238, 291, 292, 299

Notice of Adverse Decisions in Interferences

In Interference No. 97,492 involving Patent No. 3,423,737, L. R. Harper, NONDESTRUCTIVE READ TRANSISTOR MEMORY CELL, final judgment adverse to the patentee was rendered Dec. 8, 1972, as to claims 5 and 6.

[*Official Gazette July 10, 1973.*]